United States Patent
Son et al.

(10) Patent No.: US 12,242,156 B2
(45) Date of Patent: Mar. 4, 2025

(54) BACKLIGHT UNIT AND DISPLAY DEVICE INCLUDING THE SAME

(71) Applicant: LG Display Co., Ltd., Seoul (KR)

(72) Inventors: Chulgoo Son, Paju-si (KR); Kiduck Park, Paju-si (KR); Jeongho Seo, Paju-si (KR); Dongjun Cho, Paju-si (KR); Sunghyun Jung, Paju-si (KR); Inwha Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/497,610

(22) Filed: Oct. 30, 2023

(65) Prior Publication Data

US 2024/0176188 A1 May 30, 2024

(30) Foreign Application Priority Data

Nov. 24, 2022 (KR) .................. 10-2022-0159117

(51) Int. Cl.
  *G02F 1/13357* (2006.01)
(52) U.S. Cl.
  CPC .. *G02F 1/133608* (2013.01); *G02F 1/133611* (2013.01)
(58) Field of Classification Search
  CPC .................. G02F 1/133608; G02F 1/133611
  See application file for complete search history.

(56) References Cited

U.S. PATENT DOCUMENTS

| 7,275,852 | B2 * | 10/2007 | Kim .................. G02F 1/133608 362/609 |
| 7,408,599 | B2 * | 8/2008 | Tsubokura ........ G02F 1/133608 349/64 |
| 7,465,062 | B2 | 12/2008 | Kwon |

(Continued)

FOREIGN PATENT DOCUMENTS

| CN | 101676606 A | 3/2010 |
| CN | 106200126 A | 12/2016 |

(Continued)

OTHER PUBLICATIONS

European Patent Office, Extended European Search Report, European Patent Application No. 23211867.9, Apr. 17, 2024, 12 pages.

(Continued)

*Primary Examiner* — Evan P Dzierzynski
(74) *Attorney, Agent, or Firm* — Fenwick & West LLP

(57) ABSTRACT

A backlight unit is provided which includes: a bottom chassis; a light source on the bottom chassis; an optical sheet over the light source; and a support between the bottom chassis and the optical sheet, and configured to support the optical sheet. The support includes: a fastening portion fastened to the bottom chassis, a support portion contacting the optical sheet, and a body portion between the fastening portion and the support portion. The body portion includes: a first portion extending in a first direction; a second portion extending in the first direction and is between the first portion and the fastening portion; and a third portion which connects the first portion and the second portion. The first portion and the second portion are spaced apart from each other.

23 Claims, 16 Drawing Sheets

(56) References Cited

U.S. PATENT DOCUMENTS

| | | | |
|---|---|---|---|
| 7,604,365 B2* | 10/2009 | Chang | G02F 1/133608 |
| | | | 362/249.02 |
| 8,436,961 B2 | 5/2013 | Yoshikawa | |
| 10,503,011 B2 | 12/2019 | Park et al. | |
| 11,487,156 B2 | 11/2022 | Wang et al. | |
| 2006/0104083 A1 | 5/2006 | Kwon | |
| 2010/0073596 A1 | 3/2010 | Jeong et al. | |
| 2011/0134629 A1* | 6/2011 | Kim | G02F 1/133608 |
| | | | 362/97.1 |
| 2012/0013824 A1 | 1/2012 | Yoshikawa | |
| 2012/0086884 A1* | 4/2012 | Yoshikawa | G02F 1/133608 |
| | | | 362/382 |
| 2015/0346541 A1* | 12/2015 | Ando | G02F 1/133308 |
| | | | 362/606 |
| 2016/0238895 A1* | 8/2016 | Choi | G02F 1/133605 |
| 2017/0254518 A1* | 9/2017 | Vasylyev | F21V 9/08 |
| 2019/0025653 A1* | 1/2019 | Park | G02F 1/133608 |
| 2019/0121016 A1 | 4/2019 | Kim et al. | |
| 2022/0082231 A1 | 3/2022 | Chiu et al. | |
| 2022/0082888 A1 | 3/2022 | Wang et al. | |

FOREIGN PATENT DOCUMENTS

| | | |
|---|---|---|
| CN | 208521107 U | 2/2019 |
| CN | 213423647 U | 6/2021 |
| CN | 215340627 U | 12/2021 |
| CN | 114185197 A | 3/2022 |
| EP | 3432061 A1 | 1/2019 |
| JP | 2006-140160 A | 6/2006 |
| JP | 2010-161016 A | 7/2010 |
| JP | 2010-218915 A | 9/2010 |
| JP | 2019-024003 A | 2/2019 |
| JP | 2022-126010 A | 8/2022 |
| KR | 10-2016-0099774 A | 8/2016 |
| KR | 10-2019-0008042 A | 1/2019 |
| TW | 200909925 A | 3/2009 |
| TW | 201031974 A | 9/2010 |
| WO | WO 2010/116937 A1 | 10/2010 |

OTHER PUBLICATIONS

Taiwan Intellectual Property Office, Office Action, Taiwanese Patent Application No. 112145198, Oct. 25, 2024, 26 pages.
The Japan Patent Office, Office Action, Japanese Patent Application No. 2023-192921, Dec. 3, 2024, 10 pages.

* cited by examiner

BACKLIGHT UNIT AND DISPLAY DEVICE INCLUDING THE SAME

CROSS REFERENCE TO RELATED APPLICATION

The present application claims priority to Republic of Korea Patent Application No. 10-2022-0159117, filed on Nov. 24, 2023, which is hereby incorporated by reference in its entirety.

FIELD

The present disclosure relates to a display device and more particularly to a display device including a support that has elasticity between an optical sheet and a bottom chassis.

BACKGROUND

A liquid crystal display (LCD) device is one of flat panel display devices which are now being the most widely used. In general, in the liquid crystal display device, a liquid crystal material is filled between an upper substrate on which a common electrode, a color filter, etc., are formed and a lower substrate on which a thin film transistor, a pixel electrode, etc., are formed, and an electric field is formed by applying different potentials to the pixel electrode and the common electrode. Accordingly, the arrangement of liquid crystal molecules is changed, and thus, an image is displayed by controlling the transmittance of light.

Since a liquid crystal display panel (LCD panel) itself of the liquid crystal display device is a non-emissive light receiving device, the liquid crystal display device generally includes a backlight unit for providing light to the liquid crystal display panel on the rear surface of the liquid crystal display panel.

A cold cathode fluorescent lamp (CCFL) and a light emitting diode (LED) are generally used as a light source in the backlight unit. Conventionally, the CCFL that has advantages in that it has low power consumption and providing bright white light has been mainly used. However, recently, the LED that has an excellent color reproducibility, a very long lifespan, and low power consumption is increasingly used compared to the CCFL.

The backlight unit is divided into an edge type and a direct type in accordance with the position of a light source with respect to the liquid crystal display panel. The edge type backlight unit is provided with a light source located on a side surface of the liquid crystal display panel and provides light through a light guide plate from the side surface. The direct type backlight unit is provided with a light source located on a rear surface of the liquid crystal display panel and provides light to the liquid crystal display panel. Among them, the direct type backlight unit has advantages of having a high light utilization rate, being easier to handle, having an unlimited size of the display panel, and being relatively inexpensive.

When a point light source, an LED, is used as a light source of the direct type backlight unit, LED light is refracted by placing an optical lens on the light emitting surface of an LED package, in order for the LED light to be uniformly distributed over the entire liquid crystal display panel without being focused over the light emitting surface. Typically, a reflective sheet for reflecting light upward is positioned below the optical lens, and a diffusion plate for more uniformly distributing light is positioned above the optical lens.

SUMMARY

The purpose of the present disclosure is to provide a backlight unit having an elastic support between an optical sheet and a bottom chassis.

The purpose of the present disclosure is to provide a display device including the backlight unit having the elastic support between the optical sheet and the bottom chassis.

The technical problem to be overcome in this document is not limited to the above-mentioned technical problems. Other technical problems not mentioned can be clearly understood from those described below by a person having ordinary skill in the art.

In one embodiment, a backlight unit comprises: a bottom chassis: a light source on the bottom chassis, the light source configured to emit light: an optical sheet over the light source; and a support between the bottom chassis and the optical sheet, and configured to support the optical sheet, the support including a fastening portion fastened to the bottom chassis, a support portion contacting the optical sheet, and a body portion between the fastening portion and the support portion, wherein the body portion of the support comprises: a first portion extending in a first direction: a second portion extending in the first direction and spaced apart from the first portion, the second portion between the first portion and the fastening portion; and a third portion that connects together the first portion and the second portion.

In one embodiment, a backlight unit comprises: a bottom chassis; a light source on the bottom chassis, the light source configured to emit light: an optical sheet over the light source; and a support between the bottom chassis and the optical sheet, and configured to support the optical sheet, the support including: a fastening portion fastened to the bottom chassis; a support portion contacting the optical sheet; and a body portion between the fastening portion and the support portion, the body portion including: a first portion that is connected to the support portion; and a second portion that is connected to the fastening portion and is directly connected to the first portion.

In one embodiment, a display device comprises: a display panel: a bottom chassis, the display panel over the bottom chassis; a light source on the bottom chassis, the light source configured to emit light: an optical sheet over the light source; and a support that is between the bottom chassis and the optical sheet, the support including an elastic body portion and a support portion that extends from the elastic body portion to the optical sheet such that the support portion is in contact with the optical sheet, wherein a portion of the optical sheet is at a first position absent a touch of the display device at a first time, and the elastic body portion is configured to compress such that the portion of the optical sheet bends to a second position that is closer to the bottom chassis than at the first position while the display device is touched at a second time.

Other details of the embodiments are included in the detailed description and drawings.

According to the backlight unit and the display device including the same according to the embodiments, since the body portion of the support that supports the optical sheet has a cross-sectional shape of the closed loop, the body portion can have a restoring force against the bending of the optical sheet.

In addition, the body portion may have elasticity to have the restoring force against the bending of the optical sheet.

Also, image visibility can be reduced by reducing the thickness of the support portion of the support.

Advantageous effects according to the embodiments are not limited by the foregoing description. More various effects are included in this specification.

DETAILED DESCRIPTION

Figure 1:
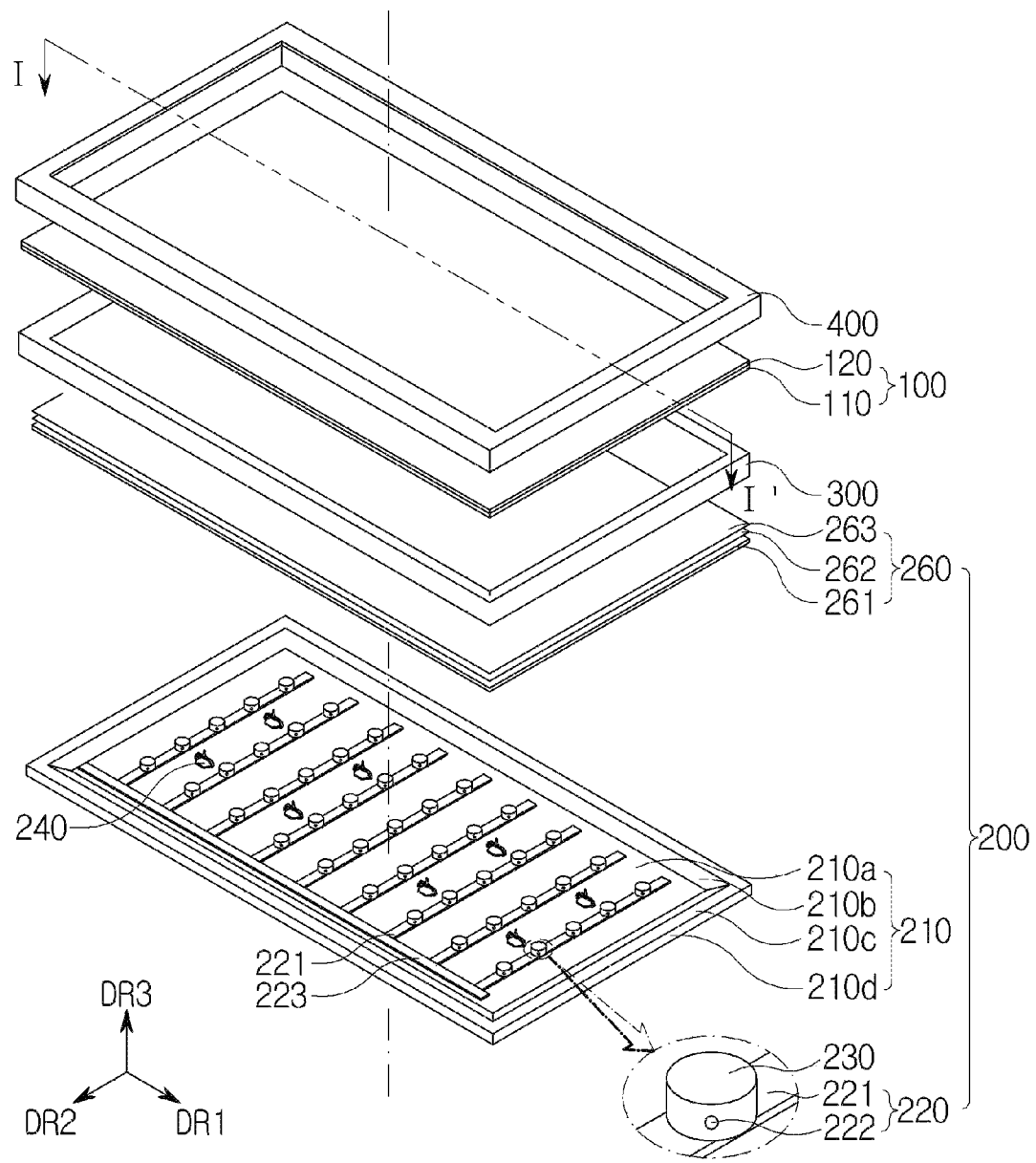
FIG. 1 is an exploded perspective view of a liquid crystal display device including a backlight unit according to an embodiment of the present disclosure.

The features, advantages and method for accomplishment of the present invention will be more apparent from referring to the following detailed embodiments described as well as the accompanying drawings. However, the present invention is not limited to the embodiment to be disclosed below and is implemented in different and various forms. The embodiments bring about the complete disclosure of the present invention and are only provided to make those skilled in the art fully understand the scope of the present invention. The present invention is just defined by the scope of the appended claims.

What an element or layer is referred to as being "on" another an element or layer includes both a case where an element or layer is just on another element or layer and a case where a further another element or layer is interposed between them. The same reference numerals throughout the disclosure correspond to the same elements. Since the shapes, sizes, proportions, angles, numbers, etc., disclosed in the drawings for describing the embodiments of the present invention are illustrative, the present invention is not limited to the shown details.

While terms such as the first and the second, etc., can be used to describe various components, the components are not limited by the terms mentioned above. The terms are used only for distinguishing between one component and other components. Therefore, the first component to be described below may be the second component within the spirit of the present invention.

The features of the various embodiments of the present disclosure can be partially or entirely coupled to or combined with each other, and the features can be technically and variously connected and driven. Also, the embodiments can be implemented independently of each other or together in an association relationship.

Hereinafter, specific embodiments of the present disclosure will be described with reference to the accompanying drawings.

Figure 2:
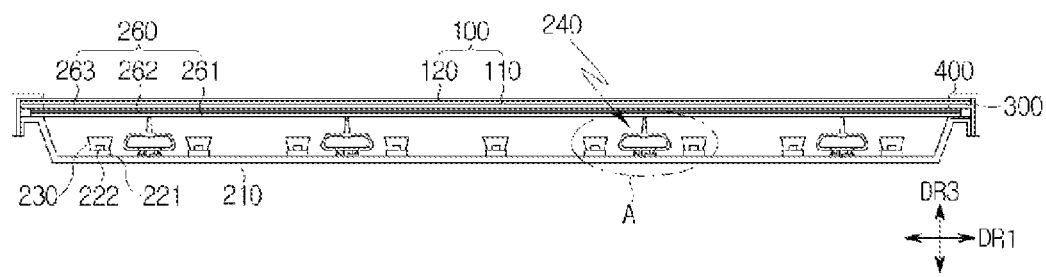
FIG. 2 is a cross-sectional view taken along line I-I' of FIG. 1 according to an embodiment of the present disclosure.

FIG. 1 is an exploded perspective view of a liquid crystal display device including a backlight unit according to an embodiment of the present disclosure. FIG. 2 is a cross-sectional view taken along line I-I' of FIG. 1 according to an embodiment of the present disclosure.

Referring to FIGS. 1 and 2, the liquid crystal display device includes a liquid crystal display panel 100 and a backlight unit 200. The backlight unit 200 supplies light to the liquid crystal display panel 100, and the liquid crystal display panel 100 controls the supplied light to display an image. The liquid crystal display device further includes a mold frame 300 positioned between the liquid crystal display panel 100 and the backlight unit 200. The liquid crystal display device further includes a top chassis 400 for protecting the liquid crystal display panel 100 by surrounding a rim of the liquid crystal display panel 100 and for preventing the liquid crystal display panel 100 from being separated from the backlight unit 200. Any one or both of the mold frame 300 and the top chassis 400 may be omitted according to the embodiment.

The liquid crystal display panel 100 includes a lower display substrate 110, an upper display substrate 120, and a liquid crystal layer (not shown). The lower display substrate 110 and the upper display substrate 120 are bonded to each other at a predetermined interval, and the liquid crystal layer may be formed between them.

The lower display substrate 110 may include a transparent insulating substrate such as glass, and a plurality of thin film transistors, data lines, gate lines, pixel electrodes, and the like formed on the transparent insulating substrate. The data line may be connected to a source terminal of the thin film transistor, and the gate line may be connected to a gate terminal of the thin film transistor. The pixel electrode made of a transparent conductive material such as indium tin oxide (ITO) may be connected to a drain terminal of the thin film transistor.

The upper display substrate 120 positioned to face the lower display substrate 110 may include a transparent insulating substrate and a color filter, a common electrode, etc., formed on the transparent insulating substrate. The color filter may include color filters capable of representing primary colors such as red, green, blue, etc., respectively. The common electrode may be formed of a transparent conductive material such as indium tin oxide (ITO) or indium zinc oxide (IZO). At least one of the color filter and the common electrode may be positioned on the lower display substrate 110.

A polarizer may be attached to each of the lower display substrate 110 and the upper display substrate 120. The polarizer may serve to polarize light incident on the liquid crystal display panel 100 and to transmit only light vibrating in one direction.

In the liquid crystal display panel 100, when the thin film transistor is turned on by a signal applied to the gate line, a signal applied to the data line is applied to the pixel electrode. Then, an electric field having a predetermined magnitude is formed between the pixel electrode and the common electrode to control the orientation of liquid crystal molecules in the liquid crystal layer. Accordingly, an image is displayed by controlling the transmittance of light passing through the liquid crystal layer.

The liquid crystal display device may include at least one driving device (not shown) such as a driver and a controller that control a signal applied to the liquid crystal display panel 100. The driving device may be mounted on the liquid crystal display panel 100 in the form of an integrated circuit chip or mounted on a printed circuit board (PCB) or a flexible printed circuit board (FPCB), and thus, may be electrically connected to the liquid crystal display panel 100. Some driving devices may be integrated into the liquid crystal display panel 100.

The backlight unit 200 may be positioned below the liquid crystal display panel 100 in order to provide light to the liquid crystal display panel 100.

The backlight unit 200 may include a bottom chassis 210, a light source unit 220 that is received or fixed (e.g., connected or attached) to the bottom chassis 210 or is supported by the bottom chassis 210, an optical lens 230, and a support 240, or an optical sheet 260.

The bottom chassis 210 may have an open top and a receiving space (e.g., a cavity) having a predetermined depth. The bottom chassis 210 may include a bottom 210a, a wing 210b (e.g., an inclined inner side surface) extending substantially obliquely upwardly around the bottom 210a, a rim 210c extending substantially horizontally outwardly from an upper end of the wing 210b, and a wall 210d (e.g., a vertical outer side surface) extending downwardly from the rim 210c.

The bottom chassis 210 may be made of a metal material such as an aluminum plate, an aluminum alloy plate, a galvanized steel plate, etc. According to the embodiment, the bottom chassis 210 may be made of a plastic material such as polycarbonate (PC).

The light source unit 220 is positioned in the cavity of the bottom chassis 210. The light source unit 220 includes a substrate 221 and a plurality of light sources 222 mounted on the substrate 221. The light source 222 may be a light emitting diode (LED) package, and is mounted on the circuit board 221 such that a light emitting surface of the LED package faces the liquid crystal display panel 100. A white LED package emitting white light may be used as the LED package, or red, green, and blue LED packages may be mixed and arranged to be used as the LED package. In addition to the LED package, other possible point light source or linear light source may be used as the light source 222.

The substrate 221 may extend in a second direction DR2. The substrate 221 may have a bar shape extending in the second direction DR2. The plurality of light sources 222 may be mounted on one substrate 221. As shown in FIG. 1, a plurality of the substrates 221 may be provided, and the plurality of substrates 221 may be arranged to be spaced apart from each other in a first direction DR1. Each substrate 221 supports one or more light sources 222 and supplies power to the one or more light sources 222. The substrate 221 may be a circuit board, and in particular, may be a metal core printed circuit board (MCPCB) capable of quickly radiating heat generated by the light source 222. The light source 222 may be supplied with electric power by being electrically connected to the wiring of the substrate 221 and may convert electrical energy into light energy and emit it.

The optical lens 230 may be mounted on the substrate 221. The optical lens 230 may be included in each light source 222, and the optical lens 230 overlaps the light source 222 in a thickness direction so as to cover the light source 222. The light that is hereby emitted from the light source 222 may be refracted and diffused through the optical lens 230. Since the optical lens 230 diffuses the upward traveling light of the light source 222 in order for the light not to be focused, the use of the optical lens 230 can reduce the number of light sources 222 and apply a high-power light source.

The optical lens 230 may be a side emitting lens that refracts and diffuses the upward traveling light of the light source 222 mainly in a lateral direction. Meanwhile, the optical lens 230 may be a top emitting lens that refracts and diffuses the light from the light source 222 mainly in an upward direction. Since the side emitting lens can reduce an optical distance compared to the top emitting lens, the optical sheet 260 to be described later can be positioned closer to the light source, and thus, the total thickness of the backlight unit 200 can be reduced, thereby being advantageous for thinning the liquid crystal display device.

As shown, when a plurality of light source assemblies are disposed, the light source unit 220 may further include one or a plurality of connecting boards 223 to supply power to each light source assembly. The plurality of light source assemblies may be coupled to the connection board 223, and, for example, like a plug, an end portion of the substrate 221 may be inserted into and coupled to an insertion hole (not shown) of the connection board 223. In some embodiments, an electric wire may be used instead of the connecting board 223 to supply power to the light source assembly.

The support 240 may be disposed between the bottom chassis 210 and the optical sheet 260. The support 240 may be fastened (e.g., connected) to the bottom chassis 210 and may support the optical sheet 260. The support 240 may come into direct contact with the optical sheet 260. A plurality of the supports 240 may be provided. The plurality of supports 240 may be disposed between a pair of adjacent planar substrates 221. As shown in FIGS. 1 and 2, the supports 240 are not disposed between all adjacent substrates 221, and may be disposed between some adjacent substrates 221 and may not be disposed between other adjacent substrates 221. However, the support 240 is not limited thereto. In addition, as shown in FIG. 1, it is shown that two supports 240 are disposed between some adjacent substrates 221. However, the support is not limited thereto. One or more than three supports 240 may be disposed between some adjacent substrates 221. Hereinafter, the support 240 described above will be described in more detail.

Figure 3:
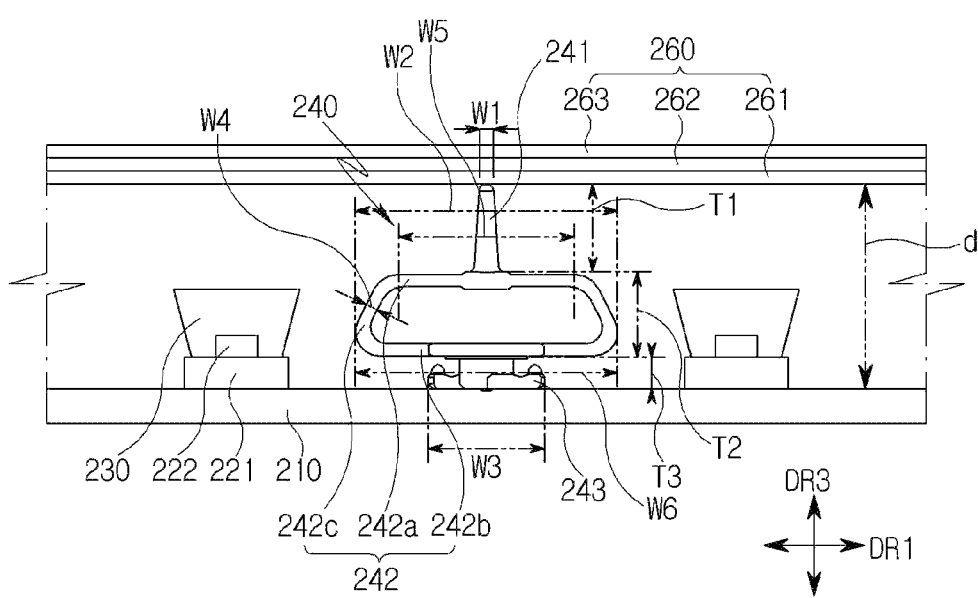
FIG. 3 is an enlarged cross-sectional view of a region "A" of FIG. 2 according to an embodiment of the present disclosure.
Figure 4:
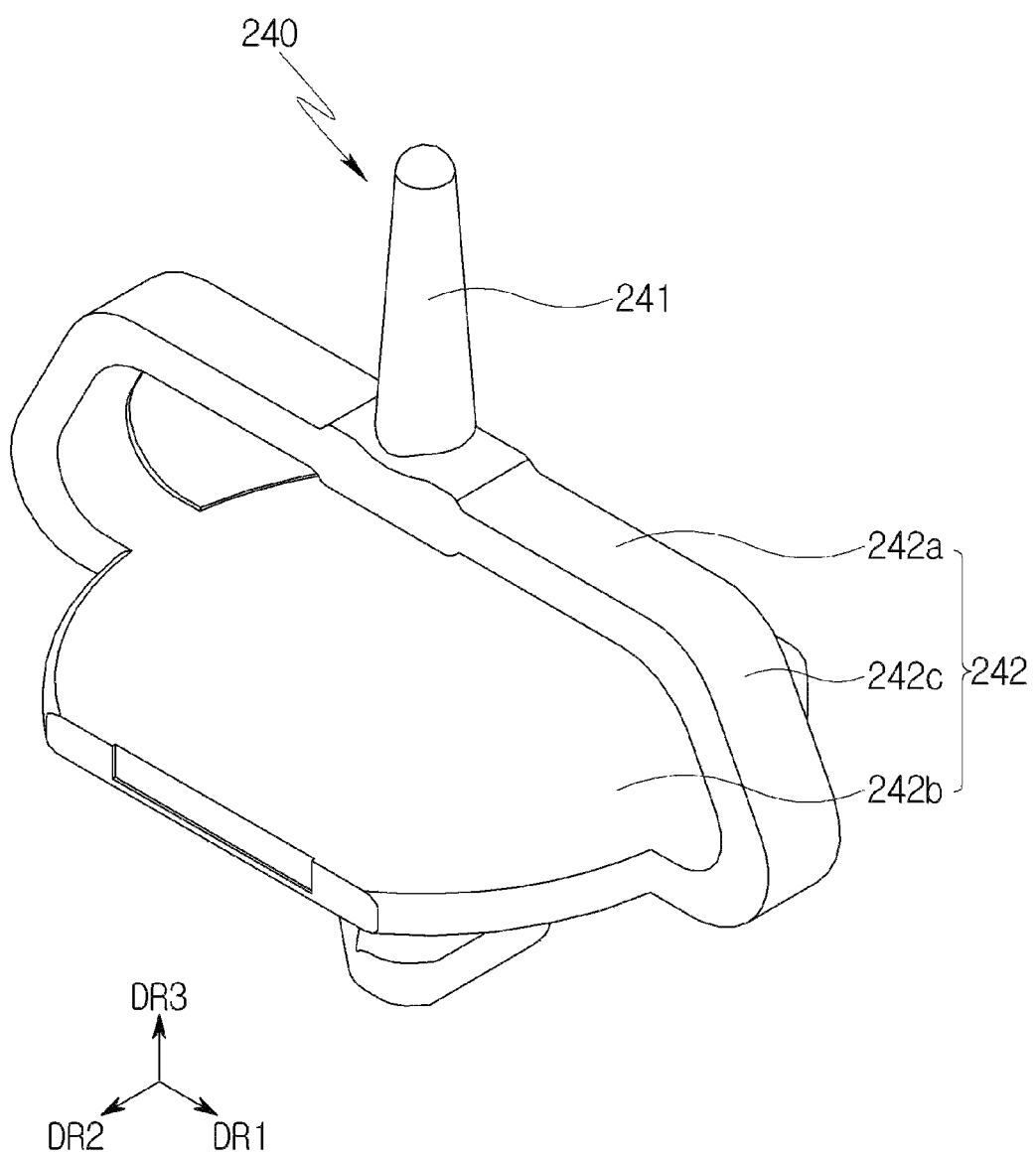
FIG. 4 is a perspective view of a support of FIG. 3 according to an embodiment of the present disclosure.
Figure 5:
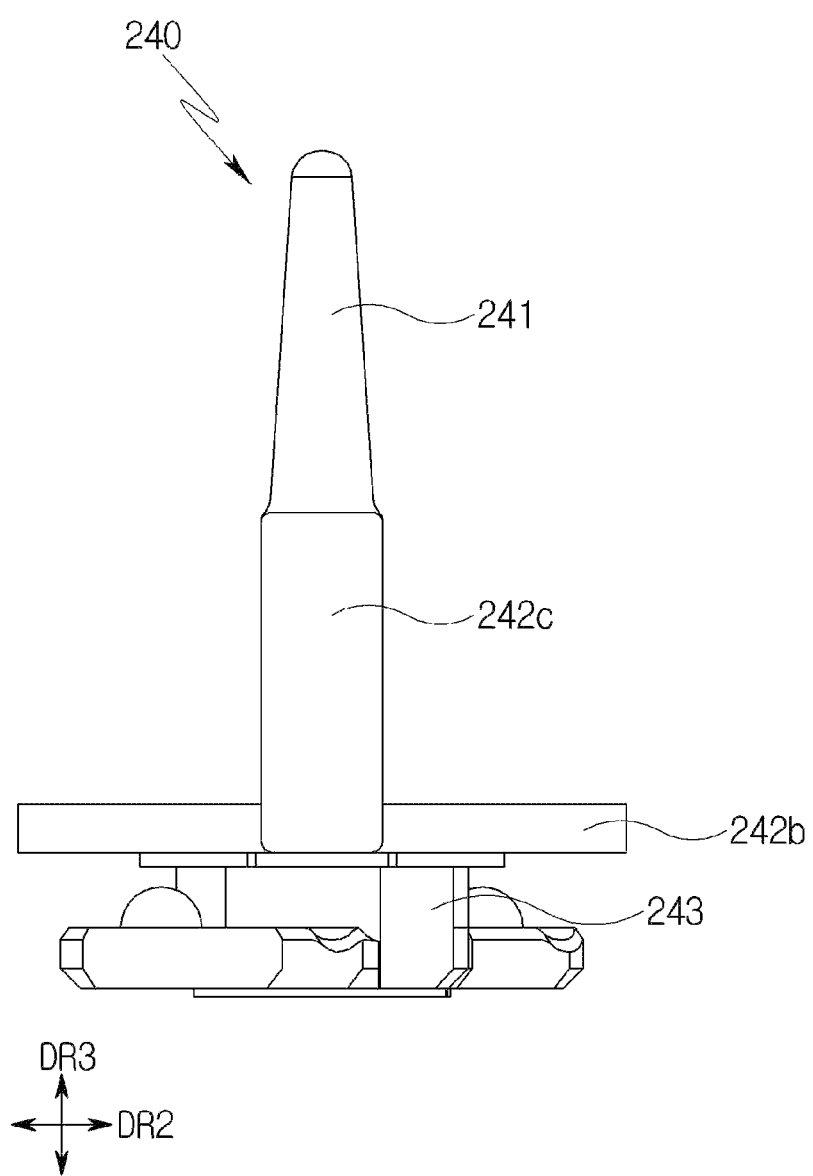
FIG. 5 is a side view of the support of FIG. 3 according to an embodiment of the present disclosure.
Figure 6:
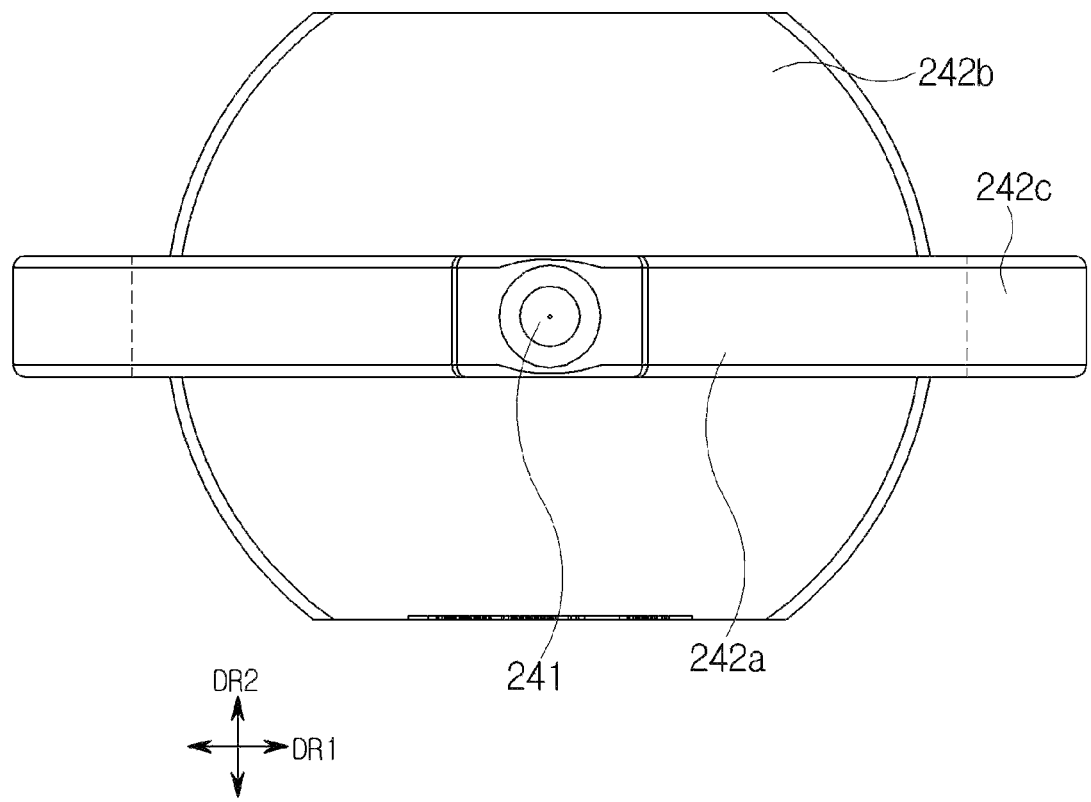
FIG. 6 is a plan view of the support of FIG. 3 according to an embodiment of the present disclosure.
Figure 7:
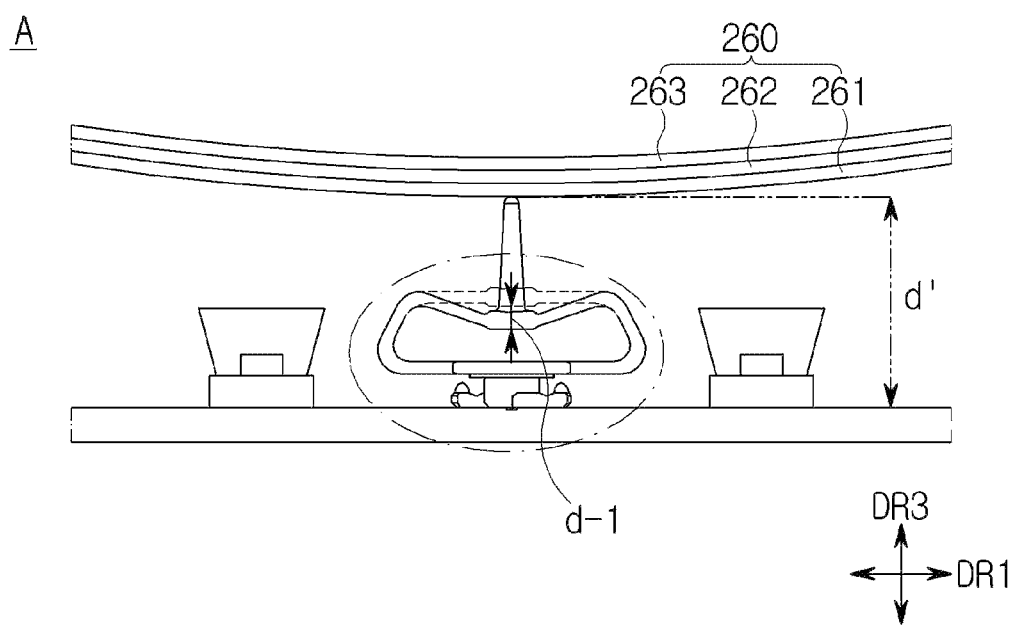
FIG. 7 is a mimetic diagram for describing a restoring function of the support according to the embodiment of the present disclosure according to an embodiment of the present disclosure.

FIG. 3 is an enlarged cross-sectional view of a region "A" of FIG. 2 according to an embodiment of the present disclosure. FIG. 4 is a perspective view of a support of FIG. 3. FIG. 5 is a side view of the support of FIG. 3 according to an embodiment of the present disclosure. FIG. 6 is a plan view of the support of FIG. 3 according to an embodiment of the present disclosure. FIG. 7 is a mimetic diagram for describing a restoring function of the support according to the embodiment of the present disclosure.

Referring to FIGS. 3 to 6, the bottom chassis 210 and the optical sheet 260 may be spaced apart from each other at a predetermined spaced distance "d". The thickness of the support 240, which extends in a thickness direction of the support 240 disposed between the adjacent substrates 221, for example, in a third direction DR3, may be the same as the spaced distance "d" between the bottom chassis 210 and the optical sheet 260. That is, a sum of a first thickness T1, a second thickness T2, and a third thickness T3 to be described below may be the same as the spaced distance "d" between the bottom chassis 210 and the optical sheet 260.

The support 240 may be made of plastic such as polycarbonate or of metal, and may be formed as a single component. In order to reduce scattering and reflection of light by the support 240, the support 240 may be coated with an optical material such as a light absorbing material.

The support 240 may include a support portion 241, a body portion 242, and a fastening portion 243.

The support portion 241 may extend in the third direction DR3 and may directly contact the optical sheet 260. The support portion 241 may have the first thickness T1 in the third direction DR3 and may have a first width W1 in the first direction DR1.

In order to reduce light scattering and reflection of light by the support portion 241, the support portion 241 may have a thin and elongated column shape (e.g., a cylinder shape, a polygonal column shape), and may have a shape in which the cross-sectional area decreases toward the top thereof. Thus, the support portion 241 tapers in a direction towards the optical sheet 260. While FIG. 4 shows the support portion 241 has a conical shape, the support portion 241 is not limited thereto. The support portion 241 may have a polygonal pyramid shape such as a triangular pyramid or a quadrangular pyramid. However, since an end portion of the support portion 241 comes into contact with the optical sheet 260, the end of the support portion 241 may be formed to be rounded or flat so as not to damage the optical sheet 260.

The body portion 242 may be disposed between the support portion 241 and the fastening portion 243. The body portion 242 may have the second thickness T2 in the third direction DR3 and may have a second width W2 in the first direction DR1. The body portion 242 is disposed below the support portion 241 and is designed to have a structure that allows the body portion 242 to have a restoring force, so that the optical sheet 260 can be prevented in advance from being bent by its own weight. The above-described structure that allows the body portion 242 to have a restoring force will be described later.

The fastening portion 243 may be disposed between the body portion 242 and the bottom chassis 210. The fastening portion 243 may be a portion of the support 240 which is fastened (e.g., connected) to the bottom chassis 210. A bottom surface of the fastening portion 243 is fastened to the bottom chassis 210. Examples of a fastening method between the fastening portion 243 and the bottom chassis 210 include soldering, bolt-nut, an adhesive, or the like, are not limited thereto. The fastening portion 243 may have the third thickness T3 in the third direction DR3 and may have a third width W3 in the first direction DR1.

In the embodiment, the first width W1 may be less than the second and third widths W2 and W3, and the second width W2 may be larger than the third width W3. In one embodiment, thickness T1 is greater than thickness T2 and thickness T3, and thickness T2 is greater than thickness T3.

The body portion 242 may include a plurality of components. The body portion 242 includes a first portion 242a which extends in the first direction DR1, a second portion 242b which disposed below the first portion 242a, overlaps the first portion 242A, and extends in the first direction DR1, and a third portion 242c which connects together the first portion 242a and the second portion 242b. A plurality of the third portion 242c may be provided. A first third portion 242c of the plurality of third portions 242c may connect a first side end of the first portion 242a in the first direction DR1 and a first side end of the second portion 242b in the first direction DR1, and a second third portion 242c may connect a second side end of the first portion 242a in the first direction DR1 and a second side end of the second portion 242b in the first direction DR1.

The first portion 242a, the second portion 242b, and the third portion 242c may have a fourth width W4, respectively. In FIG. 3, a width of a central portion of the first portion 242a (or a portion of the first portion 242a that contacts the support portion 241) may be greater than the fourth width W4. That is, a width of portions other than the aforementioned central portion of the first portion 242a (or a portion of the first portion 242a that contacts the support portion 241) may be the fourth width W4. The fourth width W4 may be less than the first width W1 of the support portion 241.

The first portion 242a and the second portion 242b may be spaced apart from each other in the third direction DR3, and the plurality of third portions 242c may be spaced apart from each other. That is, a cross-sectional shape formed by the first portion 242a, the second portion 242b, and the third portion 242c may be a closed loop shape.

The first portion 242a may have a fifth width W5 measured at a location between an end that is connected to the first portion 242a and the end that is contact with the optical sheets 260, and the second portion 242b may have a sixth width W6. The fifth width W5 may be less than the sixth width W6. That is, the cross-sectional shape of the closed loop formed by the first portion 242a, the second portion 242b, and the third portion 242c may be substantially a trapezoidal outline shape.

According to the embodiment, as described above, the first portion 242a and the second portion 242b are spaced apart from each other in the third direction DR3, and the plurality of third portions 242c are spaced apart from each other, so that the cross-sectional shape formed by the first portion 242a, the second portion 242b, and the third portion 242c may be a closed loop shape. When the optical sheet 260 is bent downward (to the other side in the third direction DR3) by the weight of the optical sheet 260, the weight of the optical sheet 260 may be transferred to the body portion 242 through the support portion 241 which directly contacts the optical sheet. As in the embodiment, since the first portion 242a and the second portion 242b of the body portion 242 are spaced apart from each other, even though the optical sheet 260 is bent downward, the cross-sectional shape of the closed loop of the body portion 242 below the support portion 241 allows the first portion 242a to be momentarily bent downward like the cross-sectional shape of the optical sheet 260 and to bear the weight of the optical sheet 260. This will be described with reference to FIG. 7.

As shown in FIG. 7, when the optical sheet 260 is bent downward due to touch of the display device for example, the first portion 242a is momentarily bent downward like the cross-sectional shape of the optical sheet 260, thereby bearing the weight of the optical sheet 260. When the optical sheet 260 is bent downward, a distance "d'" between the optical sheet 260 and the bottom chassis 210 may be smaller than the distance "d" before the optical sheet 260 is bent downward. Also, when the optical sheet 260 is bent downward, the first portion 242a is momentarily bent downward like the cross-sectional shape of the optical sheet 260, so that the central portion of the first portion 242a may be bent downward by a predetermined length (d−1). In other words, a portion of the optical sheet 260 (e.g., portion in contact with the support portion 241) is at a first position (e.g., shown in FIG. 3) absent a touch of the display device at a first time. The body portion 242 is configured to compress as shown in FIG. 7 such that the portion of the optical sheet 160 is at a second position that is closer to the bottom chassis 210 than at the first position while the display device is touched at a second time. The body portion 242 is configured to expand responsive to the display device no longer being touched at a third time such that the portion of the optical sheet 160 returns to the first position.

The first portion 242a of the body portion 242 has a restoring force and raises the optical sheet 260 upward to return to its original shape (a shape extending in the first direction DR1) after the display device is no longer touched, for example.

In the embodiment, in order for the first portion 242a of the body portion 242 to have a restoring force to raise the optical sheet 260 upward to return to its original shape (a shape extending in the first direction DR1), the body portion 242 may include an elastic material. That is, an elastic force of the body portion 242 may be greater than that of the support portion 241. In other words, the support portion 241 and the fastening portion 243 of the support 240 may be made of plastic material such as the aforementioned polycarbonate or may be made of metal each. The body portion 242 may be made of a material having a greater elastic force than those of the support portion 241 and the fastening portion 243. Thus, the body portion 242 is more elastic than the fastening portion 243 and the support portion 241.

As described above, as in the embodiment, when the first portion 242a is momentarily bent downward like the cross-sectional shape of the optical sheet 260 and bears the weight of the optical sheet 260 and the first portion 242a of the body portion 242 has a restoring force and raises the optical sheet 260 upward from being bent downward while returning to its original shape (a shape extending in the first direction DR1) again, the first portion 242a of the body portion 242 may include an elastic material, and the second portion 242b and the third portion 242c of the body portion 242 may not include an elastic material. That is, an elastic force of the first portion 242a may be greater than an elastic force of the second portion 242b and an elastic force of the third portion 242c, respectively. However, the body portion 242 is not limited thereto, and all the portions 242a, 242b, and 242c of the body portion 242 may include an elastic material.

Furthermore, when the optical sheet 260 is bent downward, in order for the first portion 242a to be momentarily sufficiently bent downward like the cross-sectional shape of the optical sheet 260, it is desirable that the above-described cross-sectional shape of the closed loop of the body portion 242 should have a sufficient area. In one embodiment, the second width W2 of the body portion 242 should be greater than the first width W1 and the second thickness T2 is about 0.8 to about 1.2 times the first thickness T1. For example, the second width W2 of the body portion 242 may be within a range from about 5 to about 10 times of the first width W1. The second width W2 of the body portion 242 is more than about five times the first width W1, so that the body portion 242 can sufficiently bear the bending of the optical sheet 260. The second width W2 is less than or equal to about 10 times the first width W1, so that physical interference between the body portion 242 and an adjacent optical lens 230 can be reduced.

Furthermore, when the second thickness T2 of the body portion 242 is more than about 0.8 times the first thickness T1, the body portion 242 can sufficiently bear the bending of the optical sheet 260, and it is possible to reduce the visibility of the support portion 241 in the image by reducing the first thickness T1 of the support portion 241. The second thickness T2 is about 1.2 times or less than the first thickness T1, so that a minimum length of the support portion 241 that supports substantially the optical seat 260 can be secured.

The second portion 242b of the body portion 242 is connected to the fastening portion 243 which has a larger area than that of the support portion 241. Therefore, as shown in FIGS. 4, 5, and 6, the second portion 242b has a larger area than that of the first portion 242a. The planar shape of the second portion 242b may be substantially a disk shape or a polygonal plate shape such as a quadrangular plate shape or a pentagonal plate shape. A width of the second portion 242b in the second direction DR2 may be greater than a width of the first portion 242a in the second direction DR2.

Although not shown, a reflective sheet may be positioned on the bottom chassis 210. The reflective sheet may serve to increase light efficiency by reflecting the light emitted from the optical lens 230 and light reflected by another structure such as a diffusion plate 261 and finally directing the light toward the liquid crystal display panel 100.

The optical sheet 260 may be disposed over the bottom chassis 210 and the reflective sheet. Accordingly, the optical sheet 260 is positioned over the light source 222, the optical lens 230, and the support 240. An edge of the optical sheet 260 may be placed on the rim 210c of the bottom chassis 210.

The optical sheet 260 may include the diffusion plate 261, a prism sheet 262, a protective sheet 263, etc. The diffuser plate 261 is used to obtain a surface light source with more uniform brightness by scattering the light. The prism sheet 262 is used to concentrate the light by adjusting the traveling direction of the light uniformly diffused by the diffusion plate 261, thereby increasing luminance. The protective sheet 263 is used to protect a prism of the prism sheet 262 from scratch or the like. The protective sheet 263 may also perform a function of widening a viewing angle narrowed by the prism sheet 262 by diffusing light.

The optical sheet 260 may not include any one of the prism sheet 262 and the protective sheet 263 and may include the other in plural. The optical sheet 260 may further include an optical sheet having other characteristics. For example, the optical sheet 260 may include a reflective polarizing sheet capable of increasing luminance efficiency by separating, transmitting, and reflecting polarization components of the light.

Meanwhile, although not shown, an inverter board that is a printed circuit board for power supply and/or a printed circuit board for signal conversion may be mounted on a bottom surface of the bottom chassis 210. The inverter board may convert external power to a constant voltage level and provide the converted external power to the light source 222. The printed circuit board for signal conversion may convert an analog data signal into a digital data signal and provide it to the liquid crystal display panel 100 through a flexible circuit board (not shown) attached to the liquid crystal display panel 100.

The liquid crystal display device may include a mold frame 300 in order to stably fix the liquid crystal display panel 100 to the backlight unit 200 at a certain height. The mold frame 300 may be substantially a quadrangular frame having a rectangular parallelepiped shape with open top and bottom thereof. For example, the mold frame 300 may be fixed to the bottom chassis 210 in a manner of surrounding the rim 210c of the bottom chassis 210 and of being caught by and fixed to a hook (not shown) that can be positioned on the wall 210d of the bottom chassis 210. Here, a portion of the mold frame 300 presses the edge of the optical sheet 260 placed on the rim 210c of the bottom chassis 210, so that movement of the optical sheet 260 can be limited. The liquid crystal display panel 100 is fixed on the mold frame 300. The liquid crystal display panel 100 may be attached to a flat surface of the mold frame 300 by an adhesive member (not shown). The adhesive member may be a cushion double-sided tape with buffering capacity in order to mitigate the impact that may be applied to the liquid crystal display panel 100.

Hereinafter, other embodiments of the support 240 according to the embodiment will be described.

Figure 8:
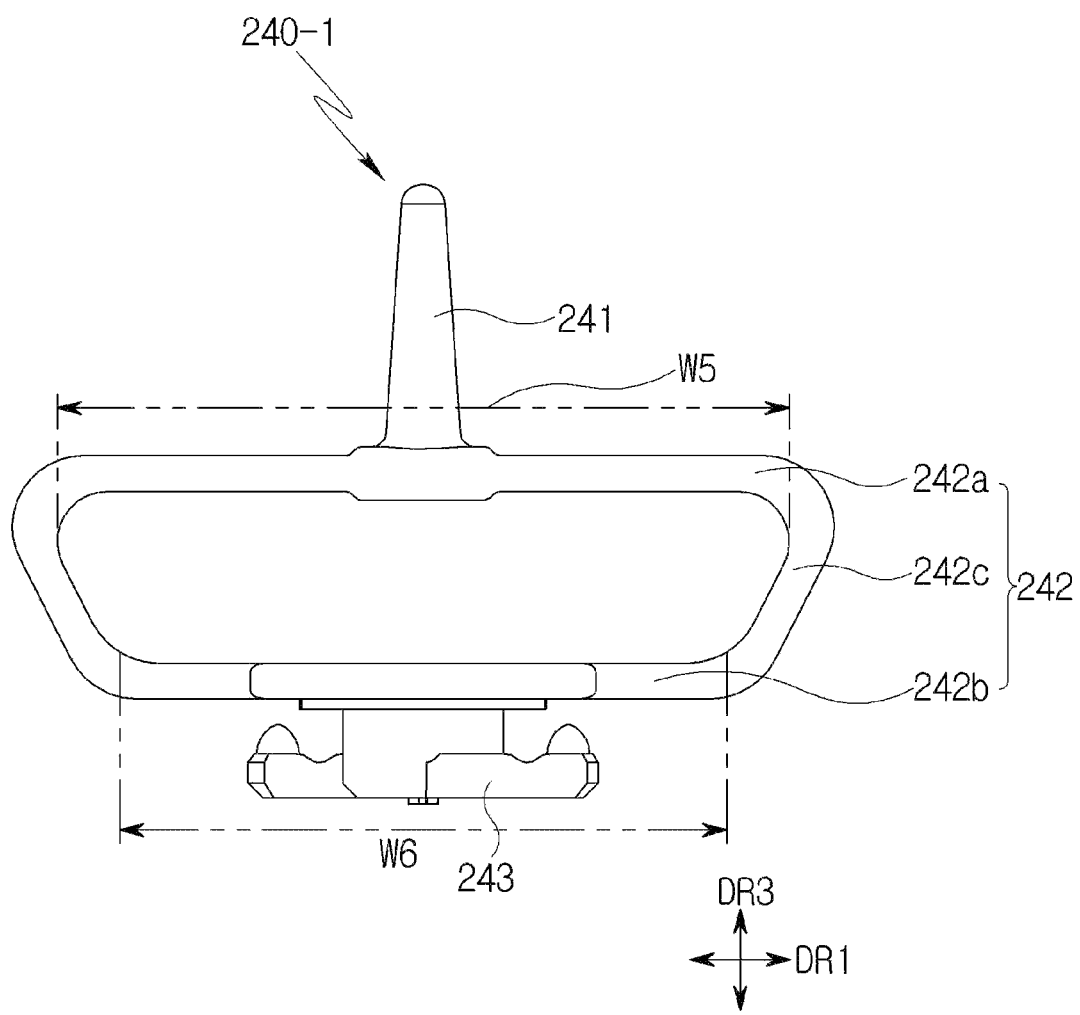
FIG. 8 is a cross-sectional view of a support according to another embodiment of the present disclosure.

FIG. 8 is a cross-sectional view of a support according to another embodiment.

Referring to FIG. 8, a support 240-1 according to the present embodiment is different from the support 240 according to FIG. 3 in that the fifth width W5 of the support 240-1 is greater than the sixth width W6. The cross-sectional shape of the closed loop formed by the body portion 242 may be substantially an inverted trapezoidal outline shape.

Other descriptions have been made above with reference to FIGS. 1 to 7. Therefore, hereinafter, detailed descriptions thereof will be omitted.

Figure 9:
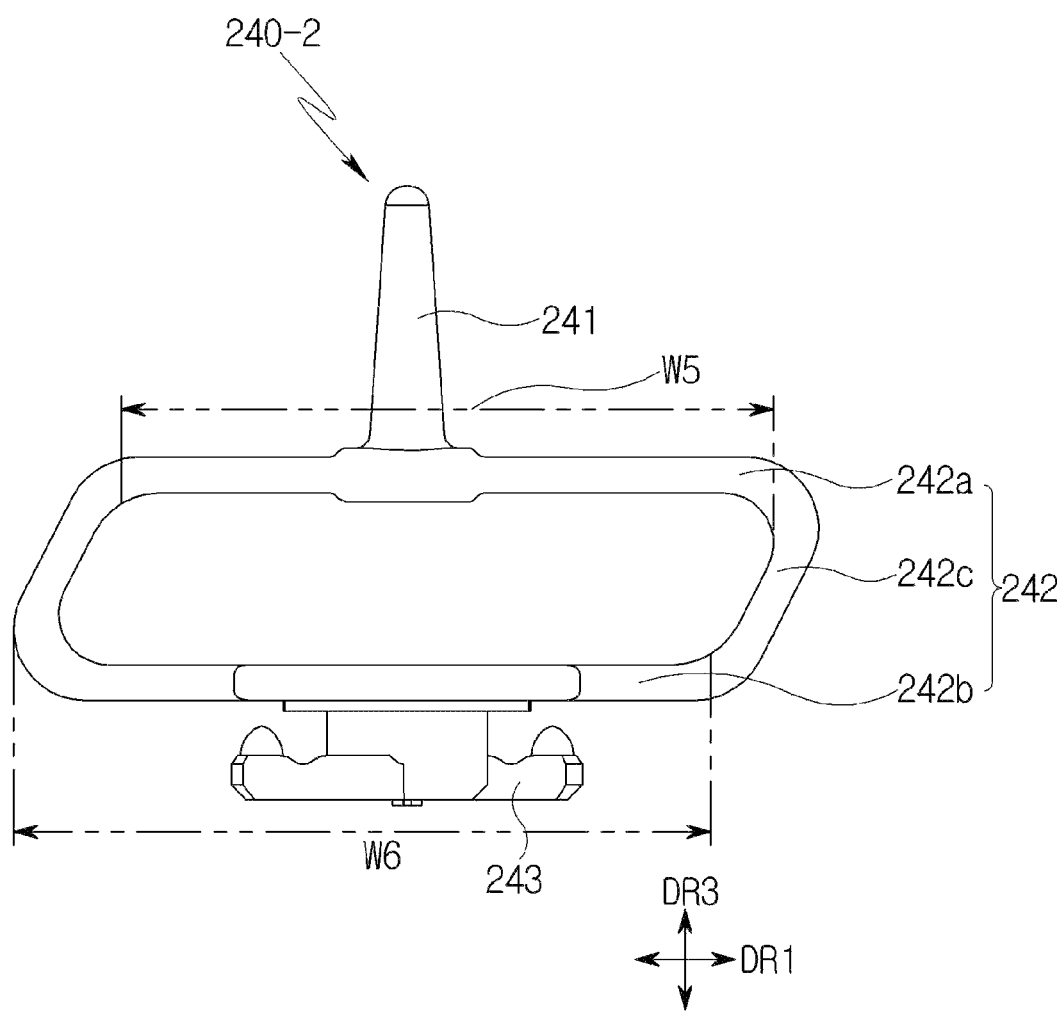
FIG. 9 is a cross-sectional view of a support according to further another embodiment of the present disclosure.

FIG. 9 is a cross-sectional view of a support according to further another embodiment.

Referring to FIG. 9, a support 240-2 according to the present embodiment is different from the support 240 according to FIG. 3 in that the fifth width W5 of the support 240-2 is the same as the sixth width W6. The cross-sectional shape of the closed loop formed by the body portion 242 may be substantially a parallelogram outline shape.

Other descriptions have been made above with reference to FIGS. 1 to 7. Therefore, hereinafter, detailed descriptions thereof will be omitted.

Figure 10:
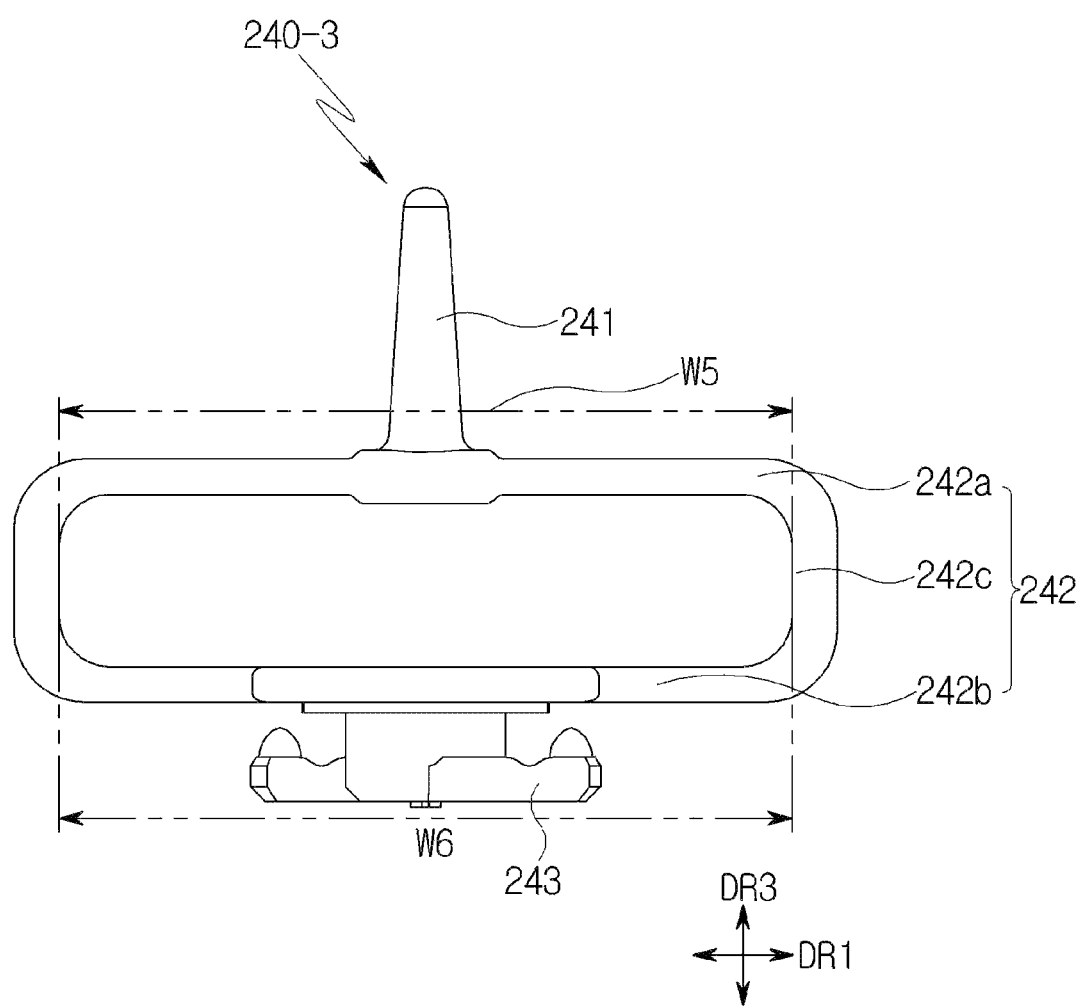
FIG. 10 is a cross-sectional view of a support according to yet another embodiment of the present disclosure.

FIG. 10 is a cross-sectional view of a support according to yet another embodiment.

Referring to FIG. 10, a support 240-3 according to the present embodiment is different from the support 240 according to FIG. 3 in that the fifth width W5 of the support 240-3 is the same as the sixth width W6. The cross-sectional shape of the closed loop formed by the body portion 242 may be substantially a rectangular outline shape. An extension direction of the third portion 242c may be the third direction DR3 and may be the same as an extension direction of the support portion 241.

Other descriptions have been made above with reference to FIGS. 1 to 7. Therefore, hereinafter, detailed descriptions thereof will be omitted.

Figure 11:
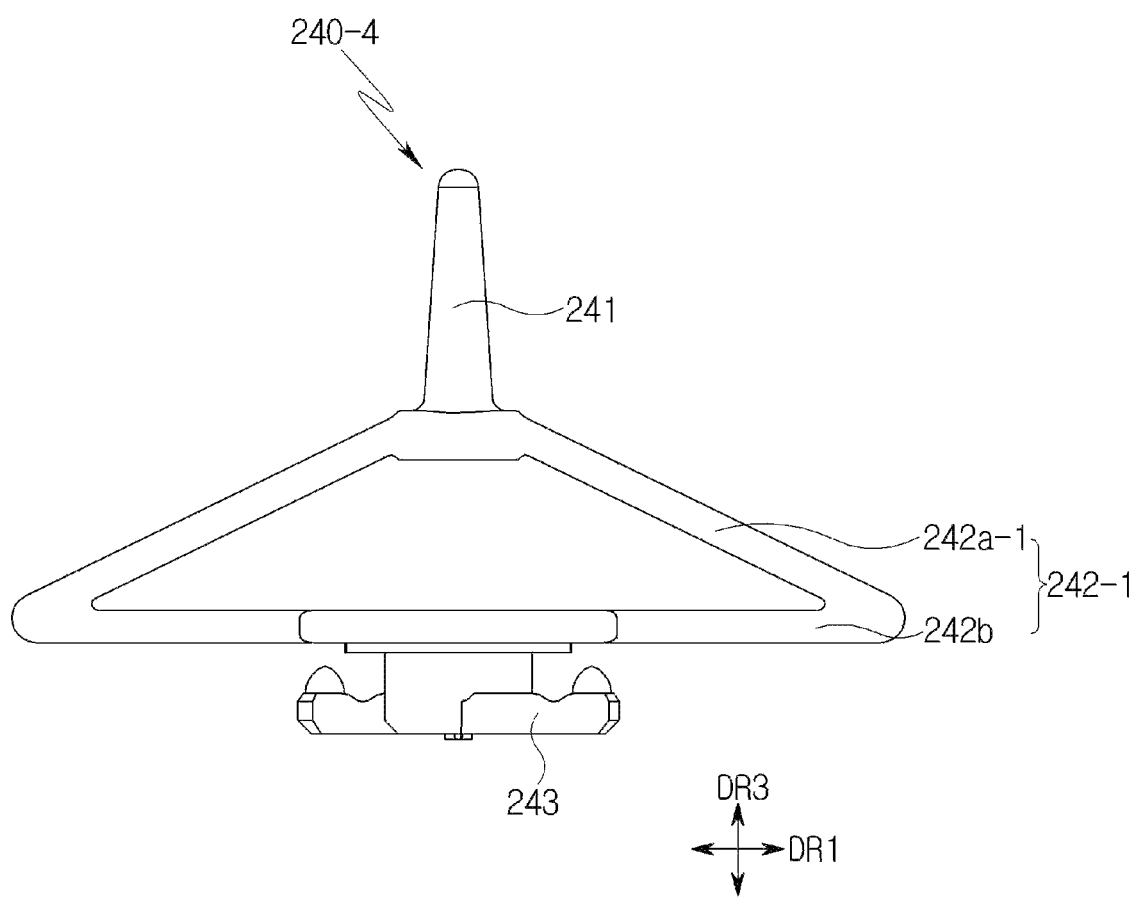
FIG. 11 is a cross-sectional view of a support according to still another embodiment of the present disclosure.

FIG. 11 is a cross-sectional view of a support according to still another embodiment.

Referring to FIG. 11, a support 240-4 according to the present embodiment is different from the support 240 according to FIG. 3 in that the third portion 242c may be omitted.

More specifically, a body portion 242-1 of the support 240-4 may include a first portion 242a-1 and a second portion 242b. A plurality of the first portions 242a-1 may be provided. One of the plurality of first portions 242a-1 may be connected to the support portion 241 and the other side end of the second portion 242b in the first direction DR1, and the other of the plurality of first portions 242a-1 may be connected to the support portion 241 and one side end of the second portion 242b in the first direction DR1. One of the plurality of first portions 242a-1 may extend in a direction (or in an oblique direction) between one direction of the first direction DR1 and one direction of the second direction DR2. The direction in which one of the plurality of first portions 242a-1 extends may cross the direction in which the second portion 242b extends. The other of the plurality of first portions 242a-1 may extend in a direction between the other direction of the first direction DR1 and one direction of the second direction DR2. The direction in which the other of the plurality of first portions 242a-1 extends may cross the direction in which the second portion 242b extends.

A cross-sectional shape of the closed loop formed by the body portion 242-1 may be substantially a triangular outline shape.

Other descriptions have been made above with reference to FIGS. 1 to 7. Therefore, hereinafter, detailed descriptions thereof will be omitted.

Figure 12:
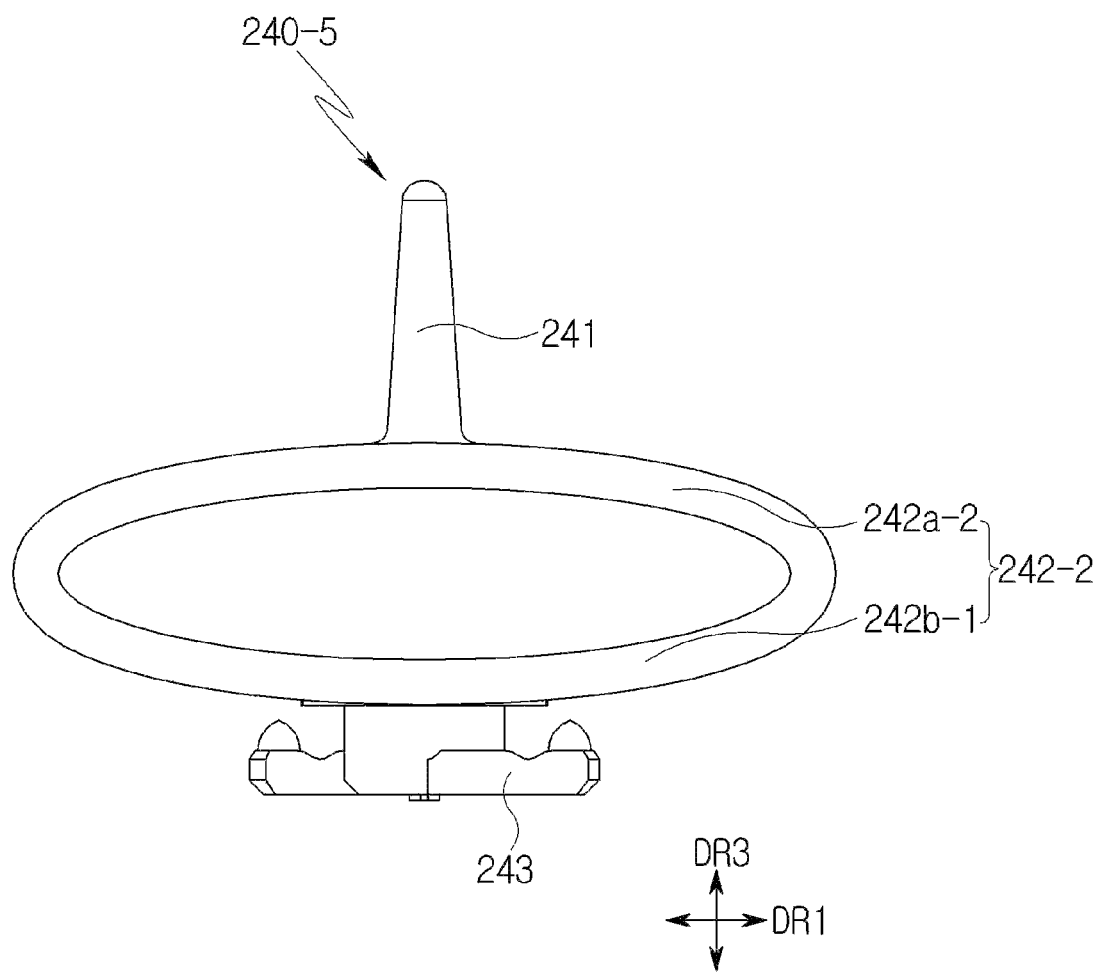
FIG. 12 is a cross-sectional view of a support according to still another embodiment of the present disclosure.

FIG. 12 is a cross-sectional view of a support according to still another embodiment.

Referring to FIG. 12, a support 240-5 according to the present embodiment is different from the support 240-4 according to FIG. 11 in that a first portion 242a-2 and a second portion 242b-1 of a body portion 242-2 each include a curved surface shape. That is, a length of the second portion 242b-1 in the first direction DR1 is curved.

More specifically, the body portion 242-2 of the support 240-5 may include the first portion 242a-2 and the second portion 242b-1. The first portion 242a-2 and the second portion 242b-1 may be provided as one each. One side end of the first portion 242a-2 in the first direction DR1 may be connected to one side end of the second portion 242b-1 in the first direction DR1, and the other side end of the first portion 242a-2 in the first direction DR1 may be connected to the other side end of the second portion 242b-1 in the first direction DR1.

The first portion 242a-2 and the second portion 242b-1 may be symmetrical to each other in the third direction DR3. That is, the first portion 242a-2 may have a convex curved surface toward one side in the third direction DR3, and the second portion 242b-1 may have a convex curved shape toward the other side in the third direction DR3. A cross-sectional shape of the closed loop formed by the body portion 242-2 may be substantially a oval outline shape.

Other descriptions have been made above. Therefore, hereinafter, detailed descriptions thereof will be omitted.

Figure 13:
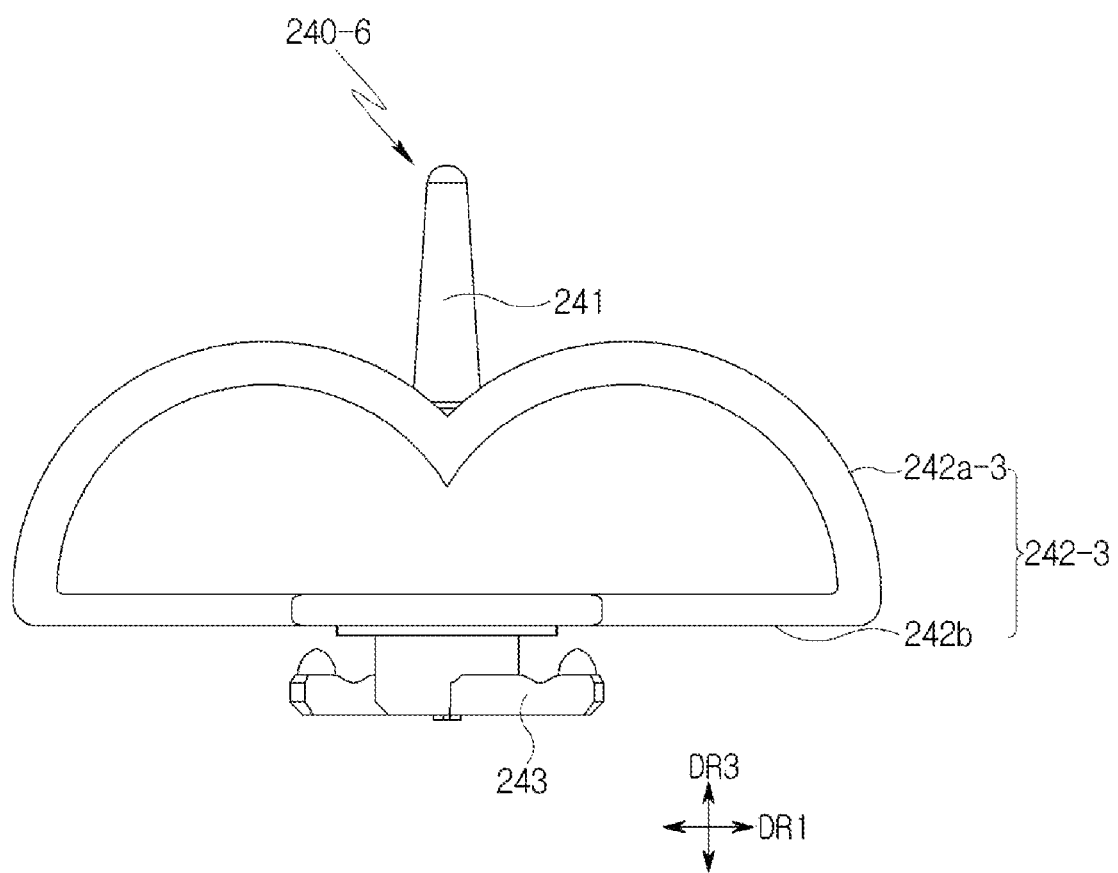
FIG. 13 is a cross-sectional view of a support according to still another embodiment of the present disclosure.

FIG. 13 is a cross-sectional view of a support according to still another embodiment.

Referring to FIG. 13, a support 240-6 according to the present embodiment is different from the support 240-4 according to FIG. 11 in that a first portion 242a-3 of a body portion 242-3 includes a curved surface shape.

More specifically, a plurality of the first portion 242a-3 may be provided. First one portion 243a-3 of the plurality of first portions 243a-3 may be connected to the support portion 241 and the other side end of the second portion 242b in the first direction DR1, and the other first portion 243a-3 may be connected to the support portion 241 and one side end of the second portion 242b in the first direction DR1. One side end of the first one portion 242a-3 in the first direction DR1 may be connected to the other side end of the other first portion 242a-3 in the first direction DR1. A cross-sectional shape of the closed loop formed by the body portion 242-3 may be substantially a dual semicircle outline shape.

Other descriptions have been made above. Therefore, hereinafter, detailed descriptions thereof will be omitted.

Figure 14:
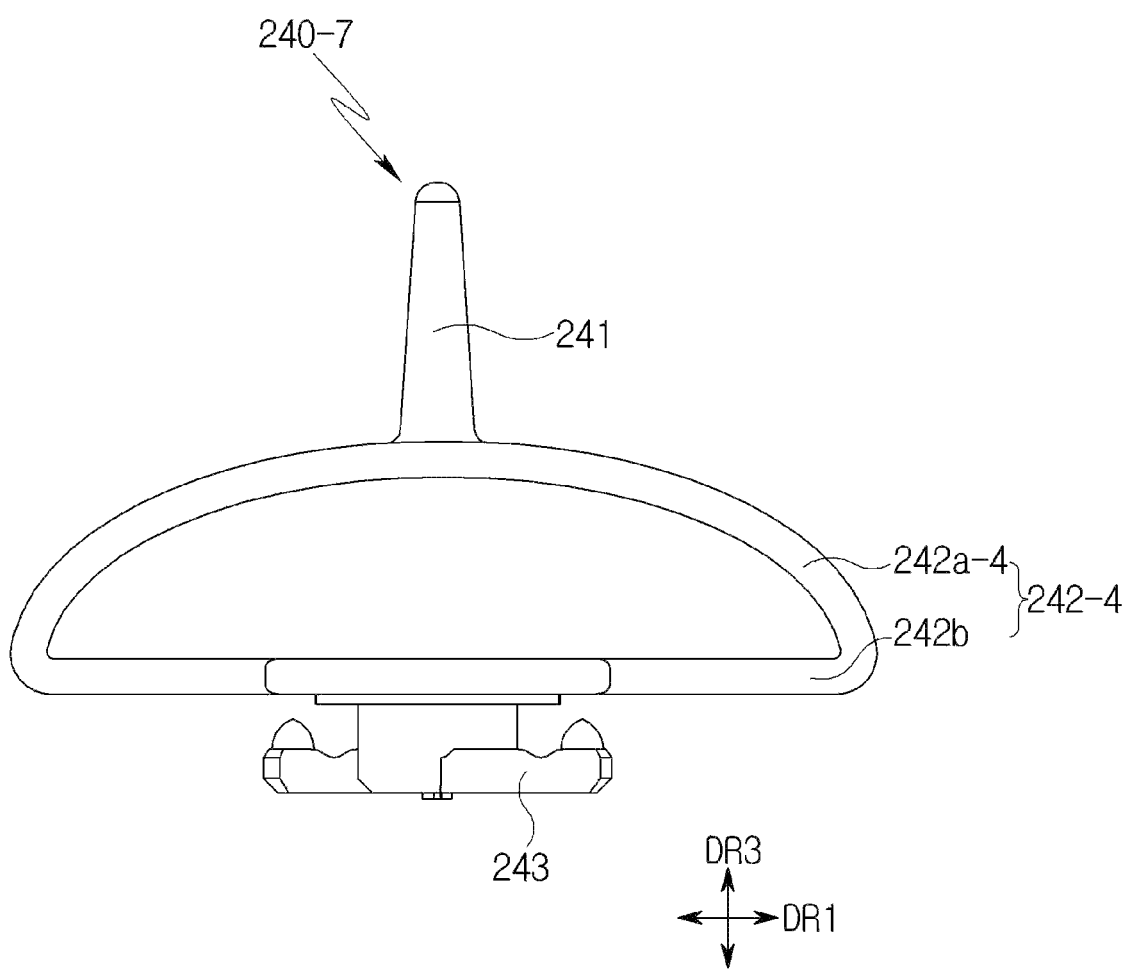
FIG. 14 is a cross-sectional view of a support according to still another embodiment of the present disclosure.

FIG. 14 is a cross-sectional view of a support according to still another embodiment.

Referring to FIG. 14, a support 240-7 according to the present embodiment is different from the support 240-5 according to FIG. 12 in that the second portion 242b according to FIG. 3 is applied to a second portion 242b of a body portion 242-4. A cross-sectional shape of the closed loop formed by the body portion 242-4 may be substantially a semicircle outline shape.

Other descriptions have been made above with reference to FIGS. 3 and 12. Therefore, hereinafter, detailed descriptions thereof will be omitted.

Figure 15:
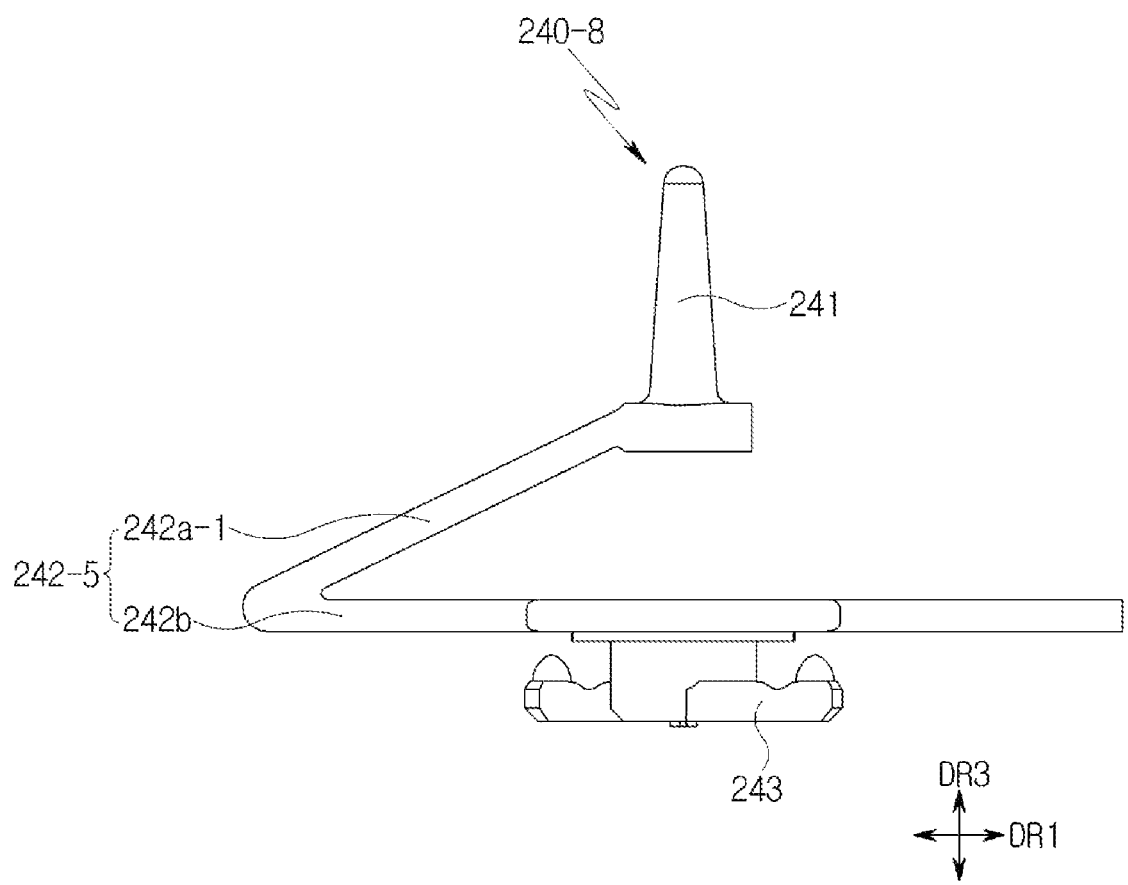
FIG. 15 is a cross-sectional view of a support according to still another embodiment of the present disclosure.

FIG. 15 is a cross-sectional view of a support according to still another embodiment.

Referring to FIG. 15, a support 240-8 according to the present embodiment is different from the support 240-4 according to FIG. 11 in that the other first portion 242a-1 of the plurality of the first portions 242a-1 located on one side of a body portion 242-5 in the first direction DR1 of the support 240-8 is omitted. As shown in FIG. 15, the first portion 242-a is connected to the support portion 241. The second portion 242b is connected to the fastening portion 243 and is directly connected to the first portion 242-a. Furthermore, as shown in FIG. 15, the second portion 242b extends in the first direction DR1 and the first portion 242-a extends in an oblique direction of the first direction.

Other descriptions have been made above with reference to FIG. 11. Therefore, hereinafter, detailed descriptions thereof will be omitted.

Figure 16:
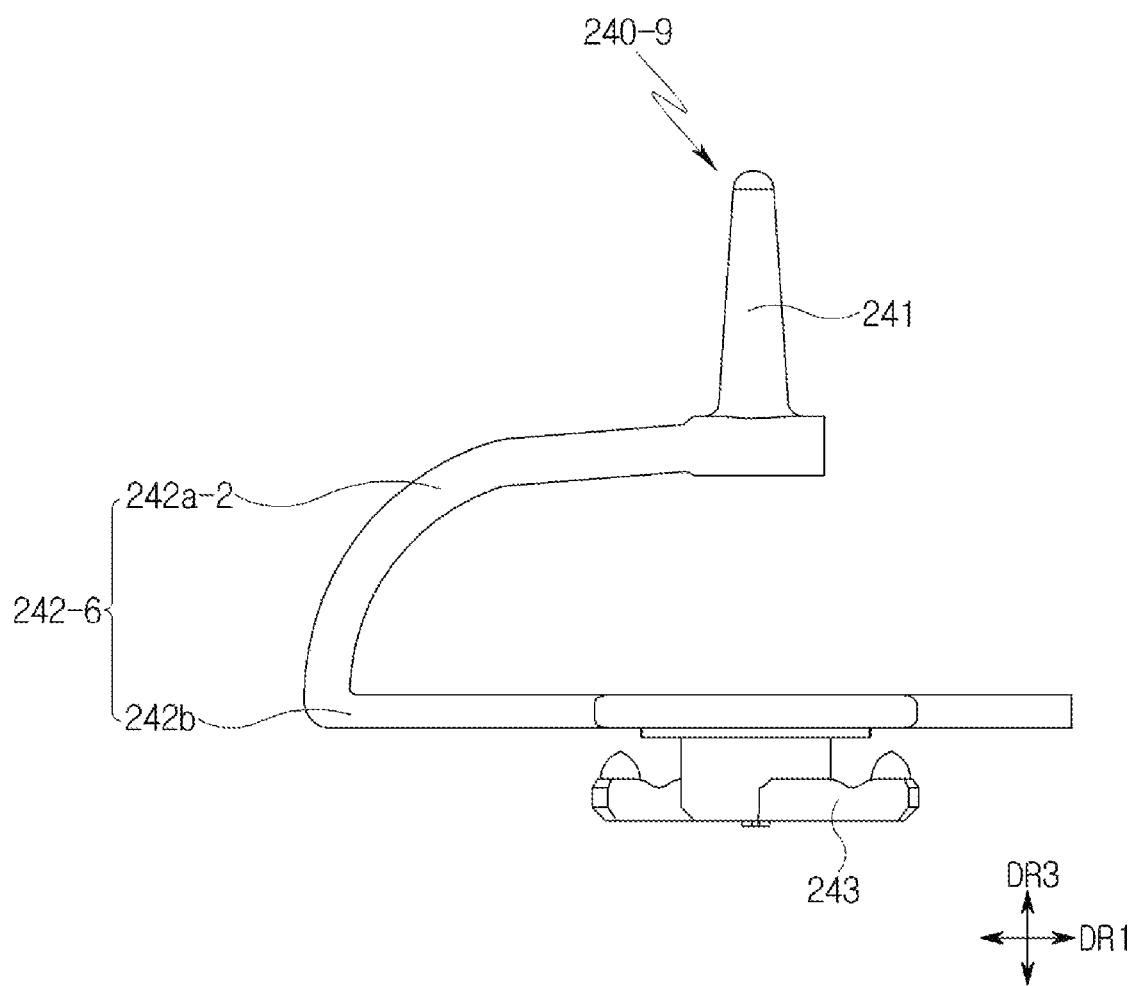
FIG. 16 is a cross-sectional view of a support according to still another embodiment of the present disclosure.

FIG. 16 is a cross-sectional view of a support according to still another embodiment.

Referring to FIG. 16, a support 240-9 according to the present embodiment is different from the support 240-7 according to FIG. 14 in that a portion located on one side of the support portion 241 of FIG. 14 in the first direction DR1 is omitted among the first portion 242a-2 of a body portion 242-6 of the support 240-9 according to the present embodiment.

More specifically, as shown in FIG. 16, the first portion 242a-2 according to the present embodiment may be directly connected to the other side end of the second portion 242b in the first direction DR1 and may extend to the support portion 241 and may not be disposed on the one side of the support portion 241 in the first direction DR1. That is, the one side end of the second portion 242b in the first direction DR1 may be exposed. In other words, as shown in FIG. 16, the first portion 242a-2 is connected to the support portion 241. The second portion 242b is connected to the fastening portion 243 and is directly connected to the first portion 242a-2. As shown in FIG. 16, the cross-section of the first portion 242a-2 is curved (e.g., a curved cross-section).

Other descriptions have been made above with reference to FIG. 14. Therefore, hereinafter, detailed descriptions thereof will be omitted.

Figure 17:
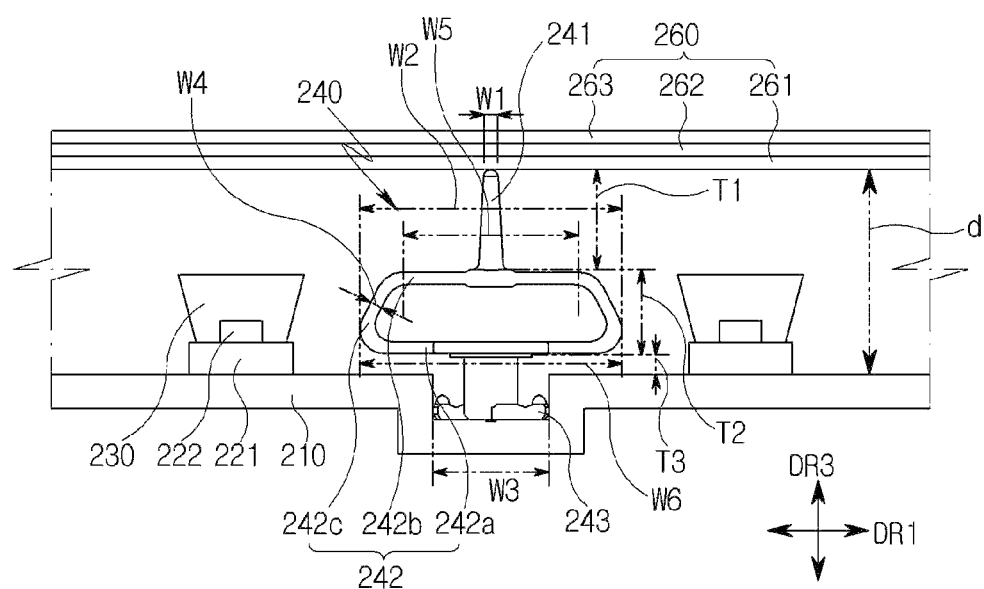
FIG. 17 is a cross-sectional view of a support according to still another embodiment of the present disclosure.

FIG. 17 is a cross-sectional view of a support according to still another embodiment.

Referring to FIG. 17, a support 240 according to the present embodiment is different from the support 240 according to FIG. 3 in that the support 240 according to FIG. 17 is disposed on the bottom chassis 210 including a groove 1700 recessed downward in the third direction DR3.

More specifically, the bottom chassis 210 may include a groove 1700 recessed downward in the third direction DR3. The support 240 may be disposed in the groove 1700. The fastening portion 243 of the support 240 may come into direct contact with the top surface of the bottom chassis 210 in the groove 1700.

Other descriptions have been made above with reference to FIG. 3. Therefore, hereinafter, detailed descriptions thereof will be omitted.

While the embodiment of the present invention has been described with reference to the accompanying drawings, it can be understood by those skilled in the art that the present invention can be embodied in other specific forms without departing from its spirit or essential characteristics. Therefore, the foregoing embodiments and advantages are merely exemplary and are not to be construed as limiting the present invention.

REFERENCE NUMERALS

100: Liquid Crystal Display Panel
200: Backlight Unit
210: Bottom Chassis
210a: Bottom
210b: Wing
210c: Rim
210d: Wall
220: Light Source Unit
221: Substrate
222: Light Source
223: Connecting Board
240: Support
241: Support Portion
242: Body Portion
243: Fastening Portion
260: Optical Sheet
261: Diffusion Plate
262: Prism Sheet
263: Protective Sheet
300: Mold Frame

What is claimed is:

1. A backlight unit comprising:
   a bottom chassis;
   a light source on the bottom chassis, the light source configured to emit light;
   an optical sheet over the light source; and
   a support between the bottom chassis and the optical sheet, and configured to support the optical sheet, the support including a fastening portion fastened to the bottom chassis, a support portion disposed under the optical sheet, and a body portion between the fastening portion and the support portion,
   wherein the body portion of the support comprises:
      a first portion extending in a first direction;
      a second portion extending in the first direction and spaced apart from the first portion, the second portion between the first portion and the fastening portion; and
      a third portion that connects together the first portion and the second portion,
      wherein the support portion has a cylinder shape, and an end of the support portion is rounded or flat, and
      wherein a bottom surface of the fastening portion is fastened to an upper surface of the bottom chassis.

2. The backlight unit of claim 1, wherein the body portion is elastic.

3. The backlight unit of claim 1, wherein a width of the body portion in the first direction is greater than five times a width of the support portion in the first direction.

4. The backlight unit of claim 1, wherein a width of the second portion in the first direction is greater than a width of the fastening portion in the first direction.

5. The backlight unit of claim 1, wherein a width of the first portion in the first direction is less than a width of the second portion in the first direction.

6. The backlight unit of claim 1, wherein a width of the first portion in the first direction is greater than a width of the second portion in the first direction.

7. The backlight unit of claim 1, wherein a width of the first portion in the first direction is a same as a width of the second portion in the first direction.

8. The backlight unit of claim 7, wherein the third portion extends in a second direction that is different from the first direction, and the support portion extends in the second direction toward the optical sheet.

9. The backlight unit of claim 1, wherein the first portion and the second portion have a same material as each other.

10. A backlight unit comprising:
a bottom chassis;
a light source on the bottom chassis, the light source configured to emit light;
an optical sheet over the light source; and
a support between the bottom chassis and the optical sheet, and configured to support the optical sheet, the support including:
a fastening portion fastened to the bottom chassis;
a support portion disposed under the optical sheet; and
a body portion between the fastening portion and the support portion, the body portion including:
a first portion that is connected to the support portion; and
a second portion that is connected to the fastening portion and is directly connected to the first portion,
wherein the support portion has a cylinder shape, and an end of the support portion is rounded or flat, and
wherein a bottom surface of the fastening portion is fastened to an upper surface of the bottom chassis.

11. The backlight unit of claim 10, wherein the body portion is elastic.

12. The backlight unit of claim 10, wherein the second portion extends in a first direction and the first portion extends in an oblique direction of the first direction.

13. The backlight unit of claim 10, wherein the first portion has a curved cross-section.

14. The backlight unit of claim 13, wherein a length of the second portion in a first direction is curved.

15. A display device comprising:
a display panel; and
the backlight unit of claim 1.

16. A display device comprising:
a display panel; and
the backlight unit of claim 10.

17. The backlight unit of claim 10, wherein the first portion and the second portion have a same material as each other.

18. A display device comprising:
a display panel;
a bottom chassis, the display panel over the bottom chassis;
a light source on the bottom chassis, the light source configured to emit light;
an optical sheet over the light source; and
a support that is between the bottom chassis and the optical sheet, the support including an elastic body portion and a support portion that extends from the elastic body portion to the optical sheet such that the support portion is in contact with the optical sheet,
wherein a portion of the optical sheet is at a first position absent a touch of the display device at a first time, and the elastic body portion is configured to compress such that the portion of the optical sheet bends to a second position that is closer to the bottom chassis than at the first position while the display device is touched at a second time.

19. The display device of claim 18, wherein the elastic body portion is configured to expand responsive to the display device no longer being touched at a third time such that the portion of the optical sheet returns to the first position.

20. The display device of claim 18, wherein the support further comprises a fastening portion that connects the support to the bottom chassis, the elastic body portion between the fastening portion and the support portion.

21. The display device of claim 20, wherein a width of the elastic body portion is wider than a width of the support portion and a width of the fastening portion, and the width of the fastening portion is wider than the width of the support portion.

22. The display device of claim 20, wherein the elastic body portion comprises:
a first portion extending in a first direction;
a second portion extending in the first direction and spaced apart from the first portion, the second portion between the first portion and the fastening portion; and
a third portion that connects together the first portion and the second portion.

23. The display device of claim 20, wherein the elastic body portion comprises:
a first portion that is connected to the support portion; and
a second portion that is connected to the fastening portion and is directly connected to the first portion.

* * * * *